(12) United States Patent
Beeman

(10) Patent No.: US 7,360,158 B1
(45) Date of Patent: Apr. 15, 2008

(54) INTERACTIVE EDUCATION TOOL

(75) Inventor: Bonnie Beeman, Renton, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 658 days.

(21) Appl. No.: 10/279,170

(22) Filed: Oct. 23, 2002

Related U.S. Application Data

(60) Provisional application No. 60/368,830, filed on Mar. 28, 2002.

(51) Int. Cl.
- G06F 3/00 (2006.01)
- G06F 3/048 (2006.01)
- G06F 15/177 (2006.01)

(52) U.S. Cl. .................. 715/705; 705/734; 705/810; 705/969

(58) Field of Classification Search ............ 715/705, 715/735, 734, 810, 105, 969; 345/705
See application file for complete search history.

(56) References Cited

U.S. PATENT DOCUMENTS

| | | | | |
|---|---|---|---|---|
| 5,479,602 A * | 12/1995 | Baecker et al. | ............ | 715/838 |
| 5,576,946 A * | 11/1996 | Bender et al. | ............... | 700/17 |
| 5,623,592 A * | 4/1997 | Carlson et al. | ............. | 715/866 |
| 5,687,315 A * | 11/1997 | Tezuka et al. | .............. | 709/220 |
| 5,794,128 A * | 8/1998 | Brockel et al. | .......... | 455/67.11 |
| 5,796,951 A * | 8/1998 | Hamner et al. | ............. | 709/223 |
| 5,930,154 A * | 7/1999 | Thalhammer-Reyero | ..... | 703/11 |
| 6,076,106 A * | 6/2000 | Hamner et al. | ............. | 709/223 |
| 6,192,470 B1 * | 2/2001 | Kelley et al. | ................. | 713/1 |
| 6,229,540 B1 * | 5/2001 | Tonelli et al. | ............. | 715/735 |
| 6,269,398 B1 * | 7/2001 | Leong et al. | ................ | 709/224 |
| 6,289,380 B1 * | 9/2001 | Battat et al. | ................. | 709/224 |
| 6,298,474 B1 * | 10/2001 | Blowers et al. | ............. | 717/104 |
| 6,330,005 B1 * | 12/2001 | Tonelli et al. | .............. | 715/735 |
| 6,336,035 B1 * | 1/2002 | Somoza et al. | ............. | 455/446 |
| 6,356,758 B1 * | 3/2002 | Almeida et al. | ............ | 455/446 |
| 6,401,119 B1 * | 6/2002 | Fuss et al. | ................... | 709/224 |
| 6,532,491 B1 * | 3/2003 | Lakis et al. | ................. | 709/223 |
| 6,535,227 B1 * | 3/2003 | Fox et al. | .................... | 715/736 |
| 6,625,454 B1 * | 9/2003 | Rappaport et al. | .......... | 455/446 |
| 6,900,822 B2 * | 5/2005 | Germain et al. | ............ | 715/736 |
| 6,941,359 B1 * | 9/2005 | Beaudoin et al. | ............ | 709/221 |
| 6,948,126 B2 * | 9/2005 | Malamud et al. | ........... | 715/715 |
| 6,971,063 B1 * | 11/2005 | Rappaport et al. | .......... | 715/733 |
| 6,983,227 B1 * | 1/2006 | Thalhammer-Reyero | ....... | 703/2 |
| 6,996,510 B1 * | 2/2006 | Reilly et al. | .................. | 703/13 |
| 7,016,949 B1 * | 3/2006 | Tagawa | ..................... | 709/223 |
| 7,043,691 B1 * | 5/2006 | Kwon et al. | ................ | 715/705 |
| 7,080,163 B2 * | 7/2006 | Aiken et al. | ................ | 709/250 |
| 7,089,335 B2 * | 8/2006 | Aiken et al. | ................ | 709/250 |
| 7,113,934 B2 * | 9/2006 | Levesque et al. | .............. | 707/1 |
| 7,165,152 B2 * | 1/2007 | Blumenau et al. | .......... | 711/152 |
| 2003/0125924 A1 * | 7/2003 | Lines et al. | ................... | 703/20 |
| 2004/0038683 A1 * | 2/2004 | Rappaport et al. | ......... | 455/446 |
| 2005/0097472 A1 * | 5/2005 | Machida | .................... | 715/736 |
| 2005/0114795 A1 * | 5/2005 | Beaudoin | ................... | 715/854 |
| 2006/0085220 A1 * | 4/2006 | Frank et al. | .................... | 705/1 |

* cited by examiner

*Primary Examiner*—Weilun Lo
*Assistant Examiner*—David Phantana-angkool
(74) *Attorney, Agent, or Firm*—Powell Goldstein LLP

(57) ABSTRACT

An interactive education tool for graphically representing components of a complex system. When the user selects a displayed component of the system, the tool provides educational information relating to the selected component. A user may then "drill-down" further into the display of the system in order to obtain additional information regarding the selected component.

28 Claims, 13 Drawing Sheets

INTERACTIVE EDUCATION TOOL

CROSS-REFERENCE TO RELATED APPLICATION

This application is a continuation-in-part application of U.S. Provisional Patent Application No. 60/368,830 filed on Mar. 28, 2002, entitled "Interactive Education Tool," naming Bonnie Beeman as inventor, which application is incorporated entirely herein by reference.

FIELD OF THE INVENTION

The present invention is directed toward an interactive education tool. More particularly, the present invention is directed toward a tool that both graphically simulates a system and provides educational information regarding components of the system.

BACKGROUND OF THE INVENTION

Complex systems have become ubiquitous in modern society, and touch every aspect of our lives. For example, a typical person may require a prescription for drugs manufactured using a complex chemical manufacturing process. In order to purchase the drug, that same person may then drive to work each day on a complex system of streets, highways, and interchanges. If that person decides to travel on a longer trip, he or she may be a passenger in a complex vehicle, such as an airplane, with thousands of interconnected parts. Even as systems that are used every day become more complex, however, these systems are more and more difficult to understand by the people who are responsible for their use and maintenance.

One type of system that is particularly complex, and yet common to people of all walks of life, is the electronic communication network. An electronic communication network may employ a variety of different devices, communication techniques, and communication media. For example, a communication network may allow the user to wirelessly transmit analog voice information from a laptop computer or personal digital assistant computer (PDA) to a base transceiver station using radio signals from a wireless modem card installed in the laptop computer or PDA. Alternately, the user may send an electronic mail message from a laptop or PDA to a wireless telephone using infrared signals, and have the wireless telephone then relay the message to a base transceiver. The base transceiver station may then convert the information carried on the received electromagnetic signals into electrical signals carried by conductive wiring, or into optical signals carried by fiber optic cable. In route to their intended destination, both the voice information and the electronic mail message may pass through a variety of routers for routing data between various portions of the network, firewalls to prevent unauthorized access to various portions of the network, and signaling gateways. Either communication may also make use of a gateway general support node for assigning IP addresses to users, a home location register containing the subscriber parameters for the user, a message store for archiving electronic mail messages, a compression service center for compressing data, a dispatcher for establishing a secure channel for the user and assigning the user to an agent, and an agent serving as a proxy for the user. Depending upon the communication configuration selected for or by the user, either communication from the user may employ different combinations of these and other devices.

Because of the complexity of various modern systems, it has become difficult for even those people who are responsible for managing these systems to fully understand them. To address this problem, some have developed simulation software tools. These simulation tools allow a user to virtually simulate a system, in order to determine how the real system would actually operate. More particularly, these tools allow a user to provide different inputs to the system, in order to simulate different outputs from the system. For example, the SPICE software application allows users to simulate the operation of electronic circuits. The user can simulate a desired circuit, provide a typical input for the simulated circuit, and the tool will provide the user with the output signal that the real circuit would produce.

Still other software tools have been developed to graphically display a system. These tools allow the user to better visualize the relationship between the various components of the system. For example, the AUTOCAD software tool will allow a user to graphically represent some components of various systems, such as an electrical circuit or an electronic communication network. While these types of tools may be useful in helping a user to understand the overall relationship between different components of a system, these tools are not as helpful for a user trying to understand the role each component plays in the system. That is, these tools do not provide information describing the function or operation of the individual components of the system. Further, these tools do not help a user to understand the costs associated with different configurations of a system, or how different types of input are processed by the various components of the system.

SUMMARY OF THE INVENTION

Accordingly, there is a need for an educational tool that will assist users in better understanding complex systems. More particularly, there is a need for an educational tool that will both display the relationship between components of a complex system and provide educational information for displayed components of the system. The present invention advantageously provides a tool for graphically representing components of a complex system. Moreover, when the user selects a displayed component of the system, the tool provides educational information relating to the selected component. A user may then "drill-down" further into the display of the system in order to obtain additional information regarding the selected component.

These and other features and aspects of the invention will be apparent upon consideration of the following detailed description of the preferred embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF PREFERRED EMBODIMENTS

Exemplary Computing System

Figure 1:
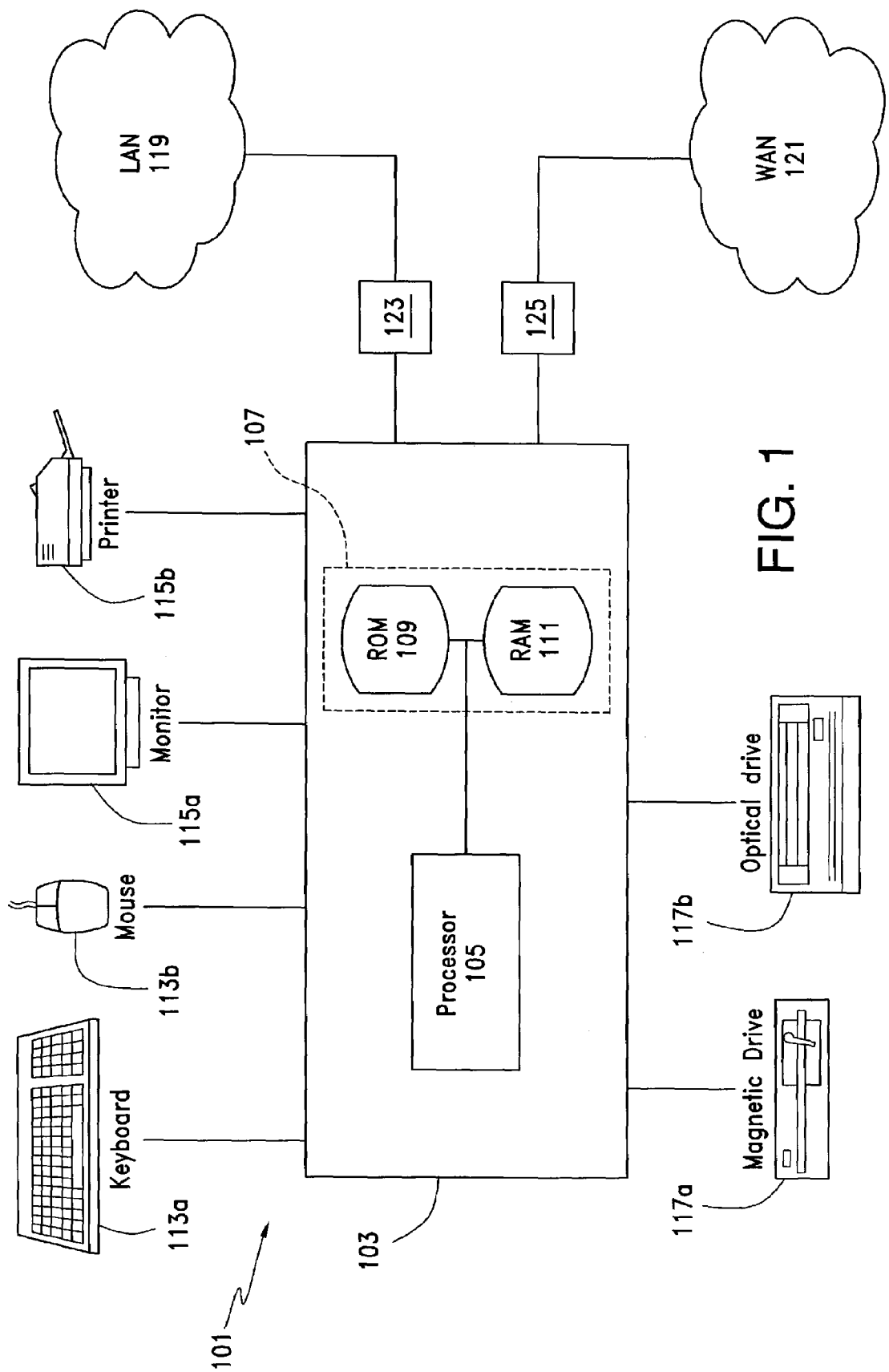
FIG. 1 shows an example of a computing device on which various embodiments of the invention may be implemented.

Various embodiments of the invention may conveniently be implemented on a computing system, such as a personal computer, a personal digital assistant computer (PDA), or a special-purpose computing device. Referring now to FIG. 1, this figure illustrates an exemplary general-purpose computing system that can be used to implement various aspects of the invention. In FIG. 1, the computer system 101 has computing device 103 that includes a processor 105, such as a programmable microprocessor, and a system memory 107 coupled to the processor 105. The system memory 107 may be implemented using any appropriate memory device, such as a microcircuit memory device. The system memory 107 will typically include both a read only memory (ROM) 109 and a random access memory (RAM) 111.

The computer system 101 will also include one or more input devices 113. For example, the computer system 101 may include a keyboard 113a and a pointing device 113b, such as a mouse or touchpad. Of course, the computer system 101 may include additional or alternate input devices 113, such as a microphone, joystick, or digitizer for accepting input through a stylus. The computer system 101 will also include one or more output devices 115, such as a display monitor 115a and a printer 115b. The computer system 101 may also include additional or alternate output devices 115. Depending upon its configuration, the computer system 101 may also have one or more peripheral data storage devices 117. The computer system 101 may have, for example, a magnetic disk drive 117a for reading from and writing to a magnetic disk (such as a hard disk drive or a floppy disk drive), and an optical disk drive 117b for reading from or writing to a removable optical disk (such as a CD ROM or other optical media). Of course, the computer system 101 may also include other types of data storage devices 117, such as magnetic cassettes, flash memory cards, digital video disks, Bernoulli cartridges.

As will be appreciated by those of ordinary skill in the art, the computer system 101 executes instructions stored in the system memory 107. These instructions may be retrieved to the system memory 107 from one or more of the peripheral storage devices. In addition, the computer system 101 may receive input data for executing the instructions from a user through the input devices 113. Similarly, the computer system 101 may output the results produced by executing the instructions to the user through the output devices 115.

Some computer systems 101 can operate in a network of other computer systems 101.

The network may be, for example, a local area network (LAN) 119 or a wide area network (WAN) 121, such as the Internet. For connection to the local area network 119, the computer system 101 may include a network interface or adapter 123. For connection to the wide area network 121, the computer system may include a modem 125 or other means for establishing communications over the wide area network 121. Of course, it will be appreciated that the network connections shown are exemplary, and that other techniques for establishing a communications link between the computer systems 101 can be used. Further, those of ordinary skill in the art will appreciate that a variety of communication protocols may be used for exchanging data between computer systems 101, such as TCP/IP, Ethernet, FTP, HTTP.

Education Tool Package

Figure 2:
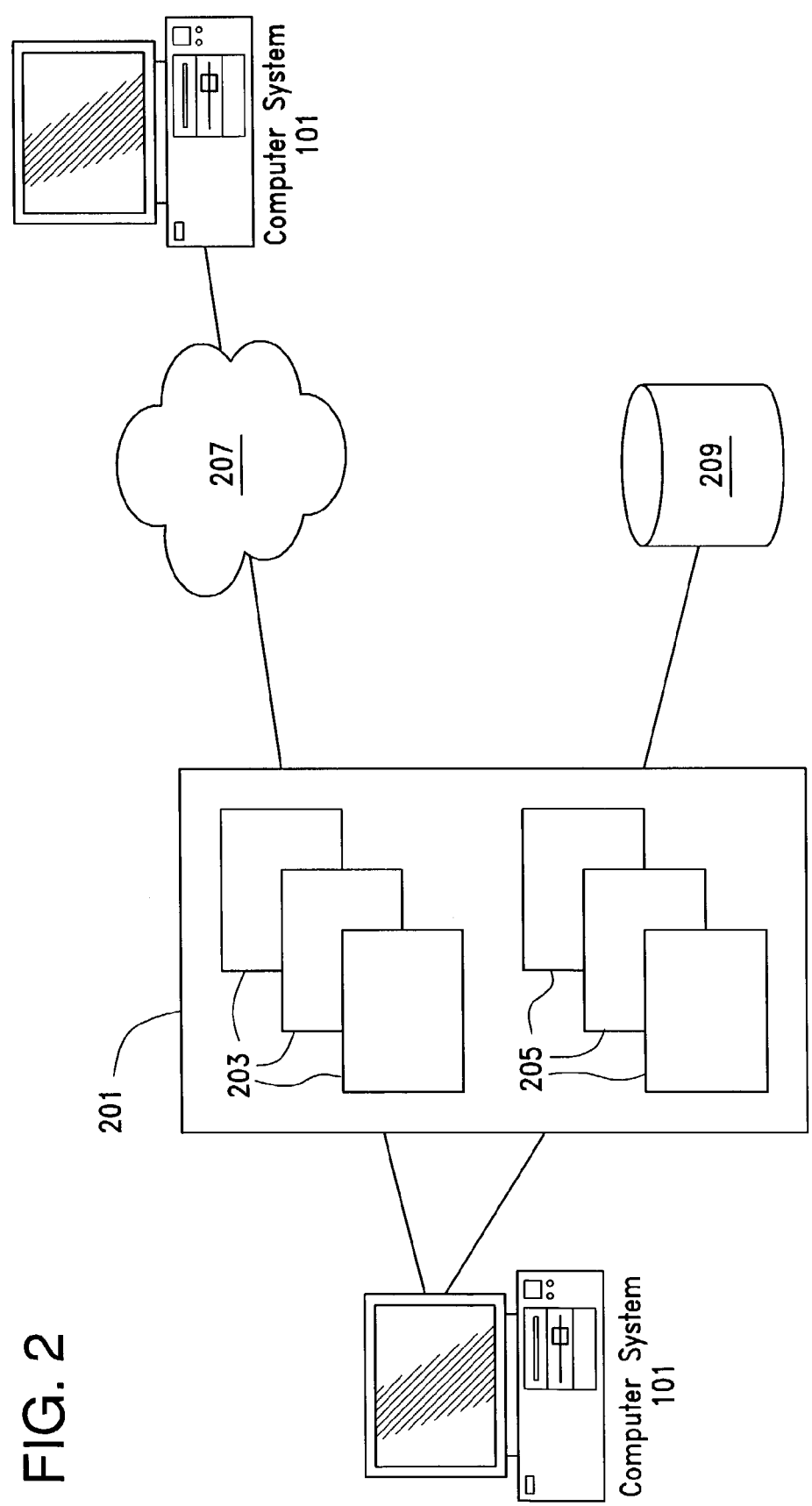
FIG. 2 illustrates an education tool package according to an embodiment of the invention.

FIG. 2 illustrates an education tool package 201 according to one embodiment of the invention. The education tool package 201 includes one or more pages or page segments 203 written in one or more markup languages. Various markup languages include, for example, the hypertext markup language (HTML), the extensible markup language (XML), the wireless markup language (WML), the wireless binary markup language (WBML), the compact hypertext markup language (CHTML), and the handheld device markup language (HDML). As will be appreciated by those of ordinary skill in the art, pages written in a markup language can be accessed and displayed using the appropriate software application. For example, a browser software application, such as Microsoft Internet Explorer or Netscape Navigator, can be employed to access and display pages written in HTML.

Further, one or more references to graphical objects may be embedded in a page written in a markup language. These graphical objects may be, for example, images stored in image files, animation processes stored in animation files such as Macromedia Shockwave animation files, links to other objects, such as pages written in a markup language, graphical objects, or executable files, or any combination thereof. When a browser application displays a page written in a markup language, the browser will render the graphical objects embedded in the page for display to a user. In addition to the pages 201, the education tool package 201 may also include one or more graphical object files 205 containing the graphical objects referenced by the pages 203.

As illustrated in FIG. 2, the computer system 101 may retrieve some or all of the education tool package 201 from another computer system 101 through a network 207, such as a wide area network (for example, the Internet) or a local area network. With this arrangement, the user can employ a local computer (sometimes referred to as a "client" to obtain and view the various pages, page segment and files of the education tool package through a remote computer (sometimes referred to as a "server.") Alternately, the computer system 101 may employ a local computer to retrieve and display some or all of the education tool package 201 from a storage medium 209, such as one or more of the peripheral data storage devices 117. As will be appreciated by those of ordinary skill in the art, both the pages or page segments 203 and the graphical object files 205 can be retrieved individually or in groups using multiple data transactions, or in their entirety using a single data transaction.

In the embodiment of the invention described below, the education tool package 201 provides educational information about a wireless electronic communication network. Accordingly, the markup language pages or page segments 203 (which, in the illustrated embodiment, use both HTML and WBML) contain graphical objects that represent the components of the wireless electronic communication network. It should be appreciated, however, that the embodiments described below are exemplary, and that alternate embodiments of the invention can be used to provide educational information for any type of system.

Use Of The Education Tool Package

Figure 3:
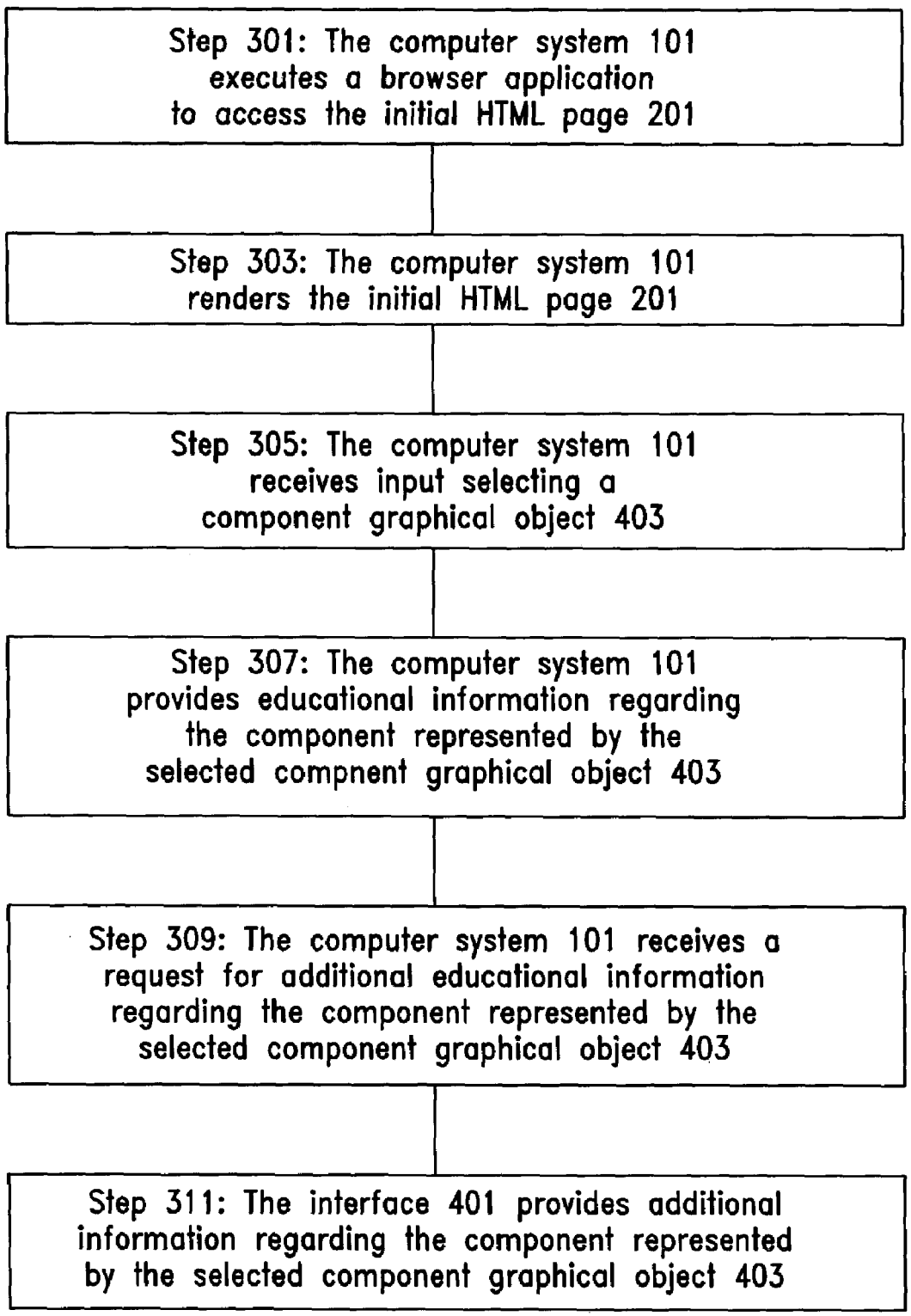
FIG. 3 is a flowchart showing the use of the education tool package according to an embodiment of the invention.

The use of the education tool package 201 according to one embodiment of the invention will now be described with reference to FIG. 3. First, in step 301, the computer system 101 executes a browser application to access the initial markup language page 201. Next, in step 303, the computer system 101, acting through the browser application, renders the initial markup language page 201. That is, the browser application displays the graphical objects embedded in the initial markup language page 201. By rendering the initial markup language page 201, the computer system 101 provides the user with the user interface 401 shown in FIG. 4A.

Figure 4A:
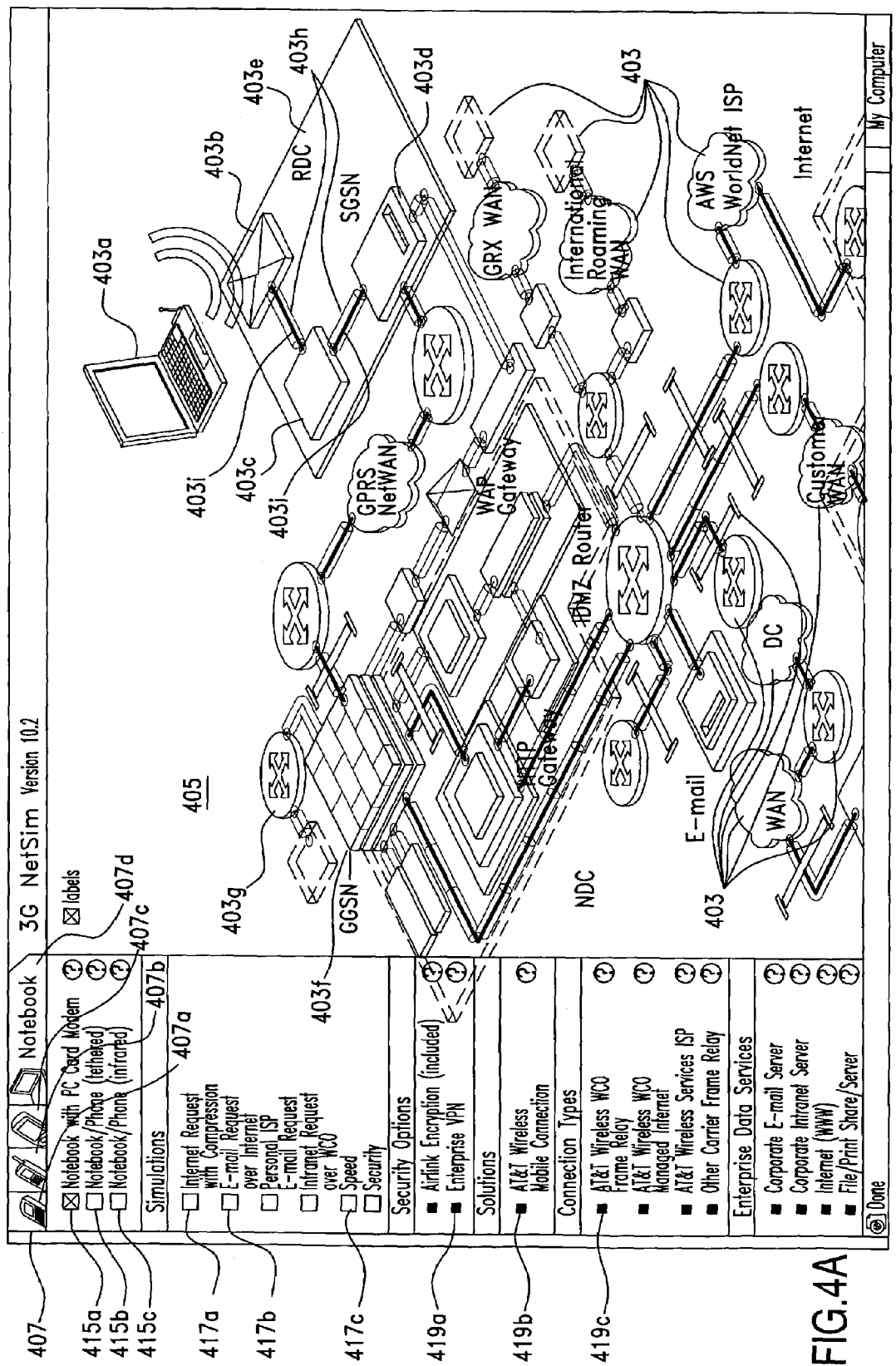
FIGS. 4A-4J illustrate various user interfaces provided by an embodiment of the invention.

As seen in FIG. 4A, the interface 401 includes a plurality of component graphical objects 403, each of which represents a component of the wireless electronic communication network. For example, the interface 401 includes a component graphical object 403a representing a notebook computer with a wireless modem card, a component graphical object 403b representing a base transceiver station, a component graphical object 403c representing a base station controller, a component graphical object 403d representing a service General Packet Radio Service (GPRS) support node (SGSN), and a component graphical object 403e representing Regional Data Center. The interface 401 also includes a component graphical object 403f representing a Gateway General Support Node (GGSN) and a component graphical object 403g representing a Research In Motion (RIM) router. Still other component graphical objects 403 represent other routers, firewalls, a signal gateway, a dispatcher, an agent, a home location register, and a message store, among other components of the wireless communication network.

The interface 401 further includes an educational information display graphical object 405, which appears as an empty space in FIG. 4A, and a configuration selection graphical object 407. As will be discussed in detail below, when a user selects one of the component graphical objects 403, education information regarding the component represented by that component graphical object 403 is displayed in the space provided by the educational information display graphical object 405.

As shown in FIG. 4A, each component graphical object 403 is configured so that it visually displays the relationship between the component it represents and the components connected to the component it represents in the actual electrical communication network. For example, the graphical objects 403b and 403c both include a pipeline image 403h between them, to visually depict the actual communication connection between the components they represent. Similarly, the component graphical objects 403c and 403d are joined by a pipeline image 403h, showing that the base station controller and the service GPRS support node represented by these component graphical objects 403 are connected in the actual wireless electronic communication network simulated in the interface 401.

In addition to simply showing static connections between components, the interface may also display operational characteristics of the simulated wireless electronic communication network. For example, the pipeline images 403h connecting the component graphical object 403b and 403c contain a dark line 403i. This dark line indicates that, when data is sent from the notebook computer using a wireless modem card (represented by the component graphical object 403a) through the wireless electronic communication network to a customer data center (not shown), the connection between the components represented by the component graphical object 403b and 403c are employed. Similarly, the pipeline images 403h connecting the component graphical objects 403c and 403d also contain the dark line 403i, indicating that the actual connection between the components they represent are employed as well when data is sent from the wireless modem-equipped notebook computer to the customer data center.

On the other hand, the pipeline images 403h between the component graphical objects 403f and 403g do not contain the dark line 403i. This omission indicates that the connection between the components represented by these component graphical objects 403 (that is, the connection between the RIM router and the Gateway General Support Node) is not employed when data is transferred from the wireless modem-equipped notebook computer to the customer data center. Thus, the display of the graphical objects 403 provides educational information regarding the operation of the system simulated by the graphical objects 403.

If a user desires additional educational information regarding one of the components represented by a component graphical object 403, the user may obtain that information by selecting the appropriate component graphical object 403 in step 305. For example, with some embodiments of the invention, the user may select a component graphical object 403 by using a pointing device, such as a mouse, to move a pointer over the display of the component graphical object 403. Of course, with other embodiments of the invention, different techniques for selecting a component graphical object 403 may be employed.

Figure 4B:
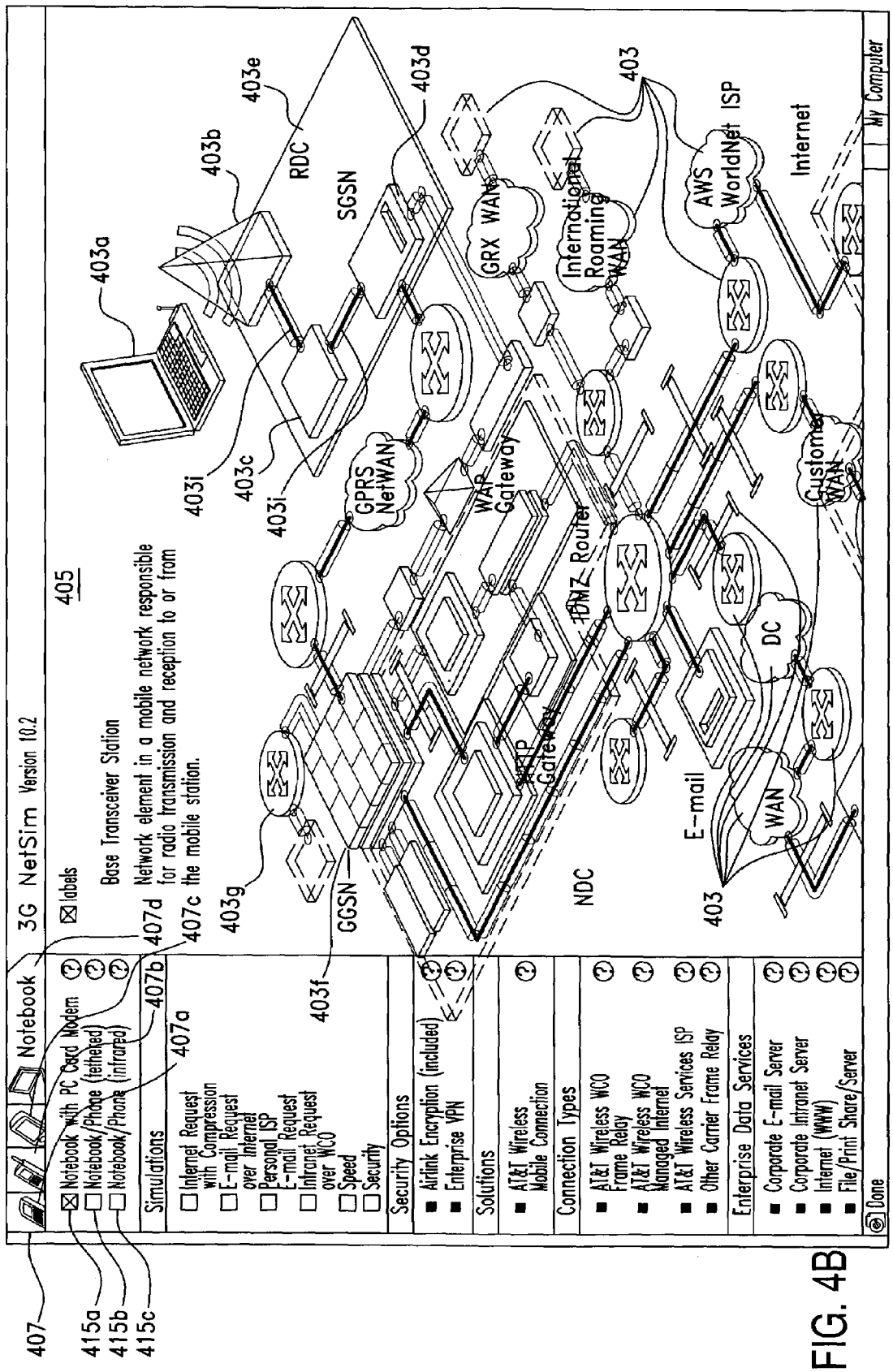

In response to the selection of a component graphical object 403, in step 307 the interface 401 provides educational information regarding the component represented by the selected component graphical object 403. More particularly, when the user selects a component graphical object 403 representing a component of the system, the information display graphical object 405 displays educational information regarding that component. Thus, if the user selects the component graphical object 403a (representing a base transceiver station), the information display graphical object 405 displays educational information regarding base transceiver stations, as shown in FIG. 4B.

As will be appreciated by those of ordinary skill, any suitable technique can be employed to display the educational information in the information display graphical object 405. For example, with some embodiments of the invention, the initial markup language page 203 may be replaced with a new markup language page 203 containing the educational information. Alternately, only the portion of the initial markup language page 201 relating to the information display graphical object 405 may be replaced. For example, a server push technique can be used to obtain a page segment 203 containing the educational information from a remote server. Still further, animation can be used to provide the educational material. For example, in the illustrated embodiment, when the user selects some component graphical objects, a Macromedia Shockwave animation process is activated to display the educational information related to the component represented by that component graphical object.

It should be noted that the animation or other technique used to display the educational information may also be conveniently used to highlight the component graphical object 403 selected by the user. For example, as seen in FIG. 4B, animation is used to change the display of the selected component graphical object 403b from a flat rectangle to a tall pyramid. Of course, other still other techniques, such as color change or fading, may be used to highlight a selected component graphical object 403.

If the user desires additional information regarding a selected component graphical object 403, the invention advantageously allows the user to "drill down" into the interface 401 in order to obtain such additional information.

Thus, in step 309, the user submits a request for additional educational information regarding the selected component of the simulated wireless communication network. For example, a user may wish to obtain additional information regarding the base transceiver station represented by the component graphical object 403b. With the embodiment shown in FIG. 4B, the user simply maintains the pointer over the component graphical object 403b and presses a command button, such as a button on the pointing device (sometimes referred to as "clicking on" the selected component graphical object 403b). It should be noted that other embodiments of the invention may employ different techniques for obtaining additional information, such as, for example, depressing a designated key after selecting a desired component graphical object 403, or holding a pointer over a desired component graphical object 403 beyond a designated time period.

In response to the request, the interface 401 provides additional information regarding the component corresponding to the selected component graphical object 403 in step 311. As will be appreciated by those of ordinary skill in the art, the additional information may be displayed using any suitable technique, such as rendering a new markup language page 203, replacing a portion of the initial markup language page 203 with, for example a page segment 203, or through activation of an animation process.

Figure 4C:
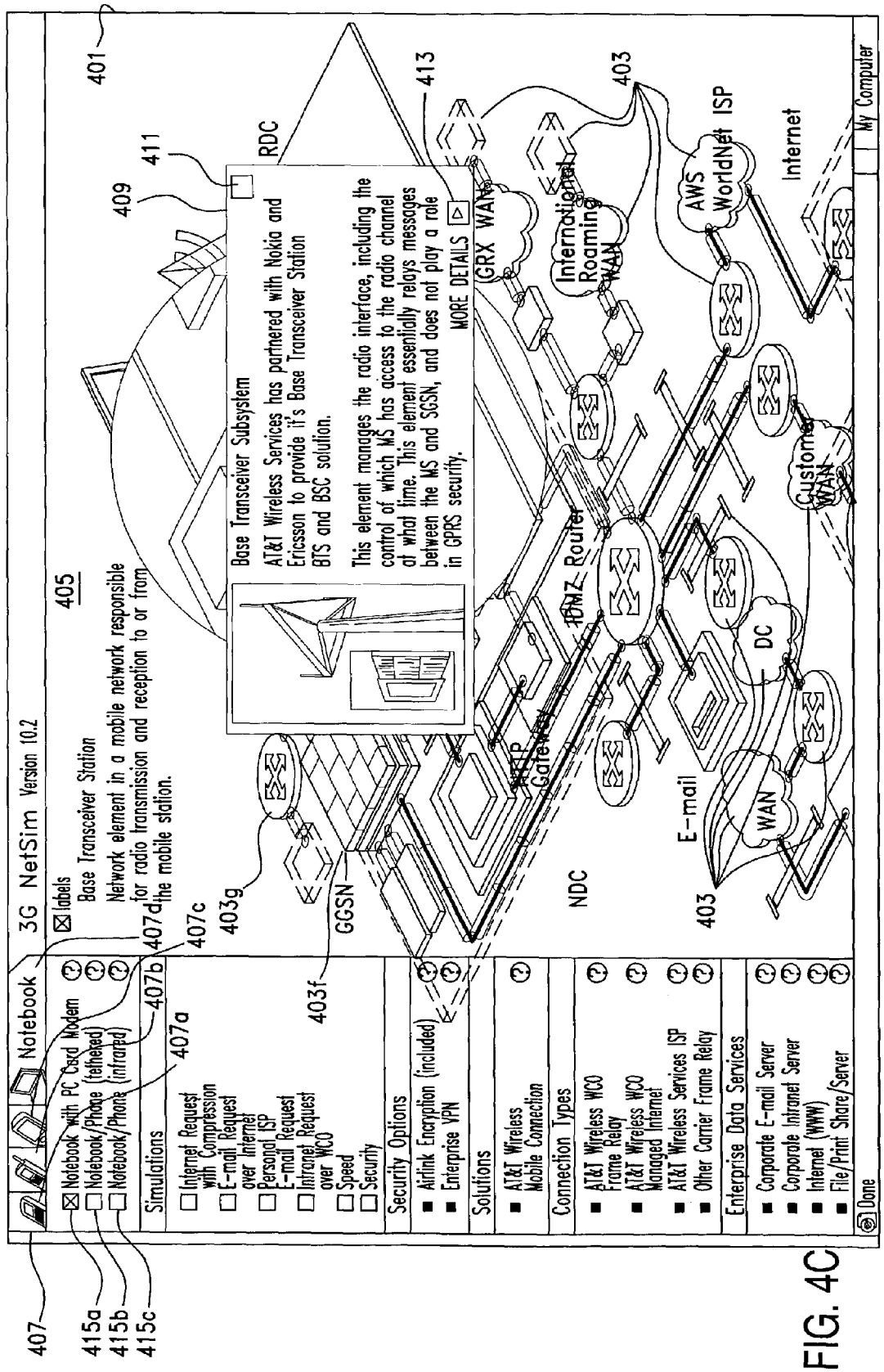

Various embodiments of the invention may present the user with the additional information via any suitable technique. For example, the additional educational information can be displayed within the interface 401, in a window that covers the interface 401, or even by audibly playing back the additional educational information. As shown in FIG. 4C, with the illustrated embodiment the additional educational content is displayed in a small window 409 placed over the representation of the wireless electronic network. Advantageously, this allows the user to maintain the context of the user's search for additional information.

Window 409 includes a "close" command 411 and an additional information request object or link 413, entitled "More Details," for requesting still more educational information. If the user is satisfied with the educational information in the window 409, the user can close the window 409 by activating the "close" command 411. Alternately, if the user desires still more information regarding the component represented by the selected component graphical object 403, the user can activate the additional information request object 413.

If the user activates an additional information request object 413, then the additional educational information associated with that object can also be presented using any suitable technique, such as being displayed within the interface 401, displayed in a window that covers the interface 401, or even by audibly playing back the additional educational information. In the illustrated embodiment, however, the additional education information is also presented within the user interface 401, so that the user can maintain the context of his or her request for that additional education information. While only one level of additional information request objects 413 are shown in the illustrated embodiment, it should be appreciated that any number of levels of additional information request objects 413 can be employed as desired to provide a user with information regarding a component of the simulated system. That is, each set of additional educational information can itself contain one or more additional information request objects 413 referencing still more educational information.

Figure 4D:
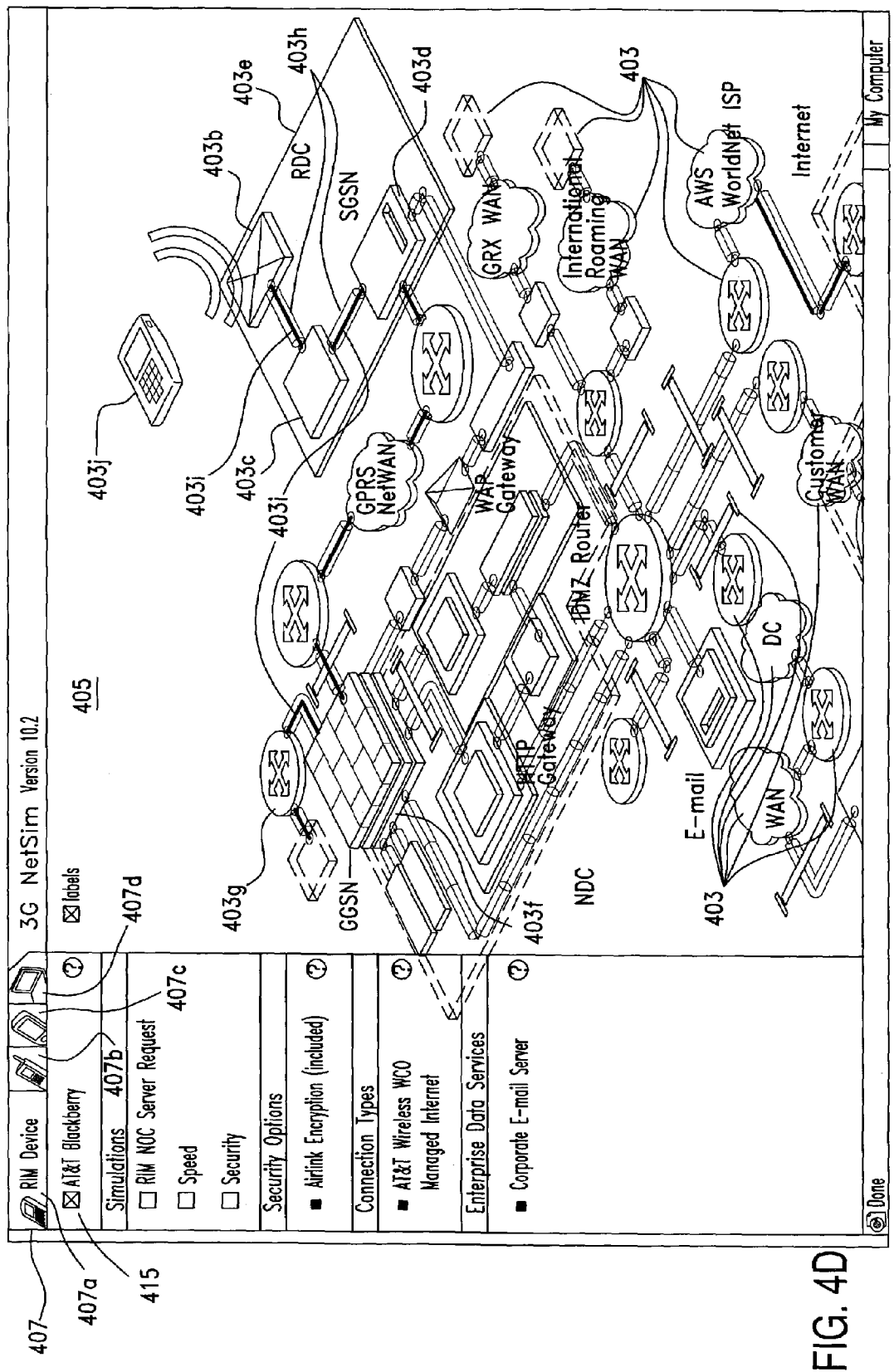
Figure 4E:
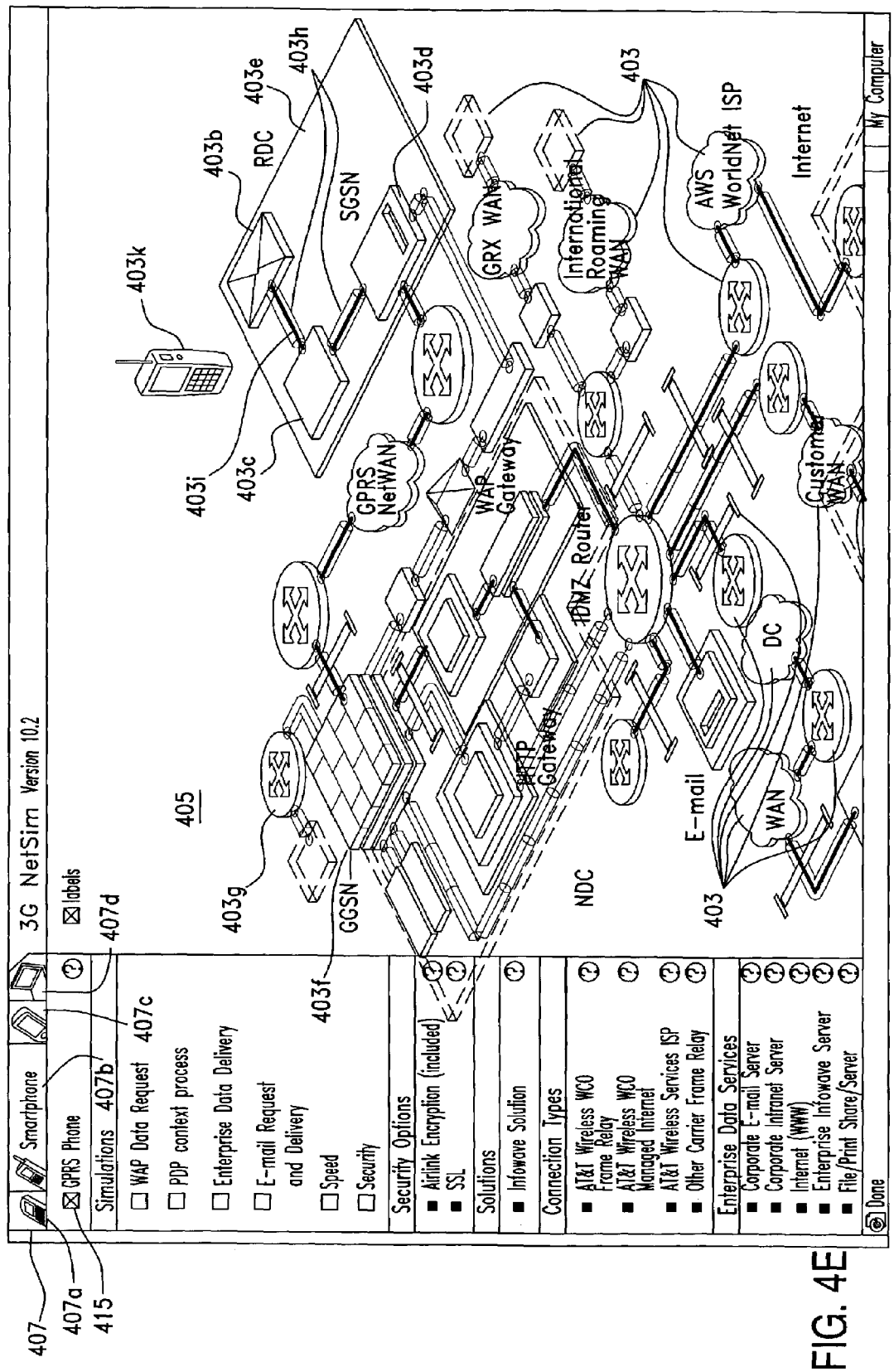
Figure 4F:
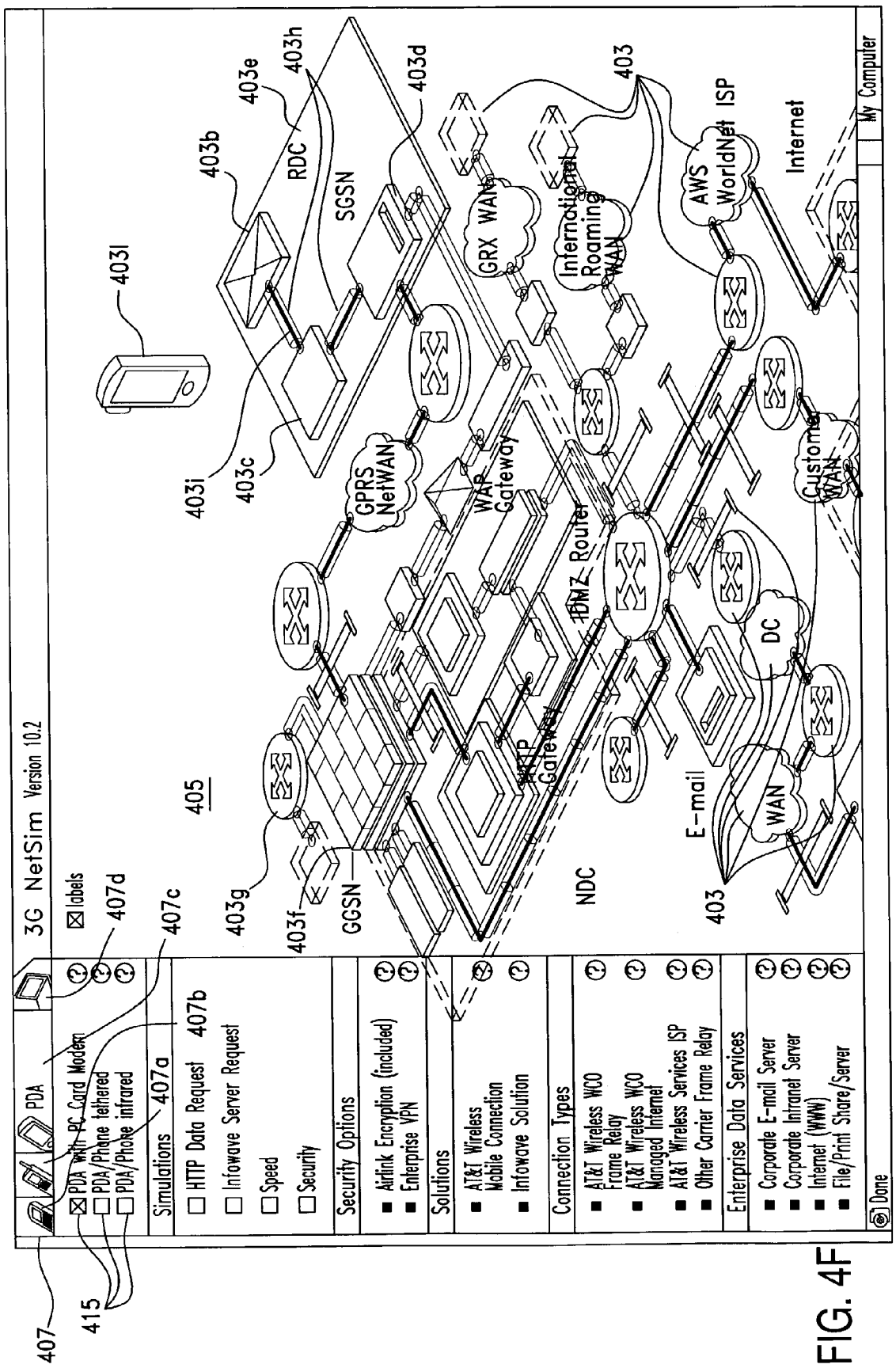

Returning now to FIG. 4A, as previously noted, the configuration selection graphical object 407 includes a series of tab sub-interfaces 407a-407d. Each of these sub-interfaces 407 corresponds to the use of a different entry device into the wireless electronic communication network being simulated in the interface 401, and the selection of any of these links will reconfigure the interface 401 to simulate a system configuration using the corresponding entry device. For example, if the user selects the tab sub-interface 407d, then the interface 401 will no longer display a component graphical object 403a representing a wireless modem-equipped laptop. Instead, as shown in FIG. 4D, the interface 401 displays a component graphical object 403j representing a RIM Blackberry device. Similarly, if the user selects the tab sub-interface 407b, the interface 401 displays a component graphical object 403k representing a smart telephone, as shown in FIG. 4E. Still further, if the user selects the tab sub-interface 407c, the interface 401 displays a component graphical object 403l representing a personal digital assistant, as shown in FIG. 4F.

In addition to simply replacing the component graphic object 403 representing the entry device, selecting a tab sub-interface 407a-407d causes the interface 401 to display the component graphical objects 403 according to the configuration of the simulated wireless network employed by that entry device. For example, as previously noted, the connection between the RIM router (represented by the component graphical object 403g) and the Gateway General Support Node (represented by the component graphical object 403f) is not employed when data is transferred from a wireless modem-equipped laptop to the customer data center. When a RIM Blackberry device is used to transfer data to the customer data center, however, the connection between the RIM router and the Gateway General Support Node is employed. Accordingly, when the tab sub-interface 407a (corresponding to the use of a RIM Blackberry) is selected, the interface 401 displays the component graphical objects 403f and 403g so as to indicate that the connection between the two components they represent is employed. More particularly, when the tab sub-interface 407a is selected, the pipeline images 403h connecting the component graphical objects 403f and 403g contain a dark line 403i, as shown in FIG. 4D. Of course, any other changes appropriate to the entry device represented by a selected tab sub-interface will also be displayed.

As will be appreciated by those of ordinary skill in the art, the tab sub-interfaces 407a-407d can be implemented using a variety of techniques. For example, the tab portion of each tab sub-interface 407a-407d may be a link to a new markup language page 203. Alternately, activating a tab portion of a tab sub-interface 407a-407d may replace various portions of the initial markup language page 203 with one or more page segments 203 containing new component graphical objects 403. Of course, still other techniques for implementing the tab sub-interfaces 407a-407d will be apparent to those of ordinary skill in the art. Also, while the described embodiments illustrate tab sub-interfaces 407 for some exemplary entry devices, it should be appreciated that a tab sub-interface 407 can be provided for any desired communication device that can provide entry to a communication network simulated by the invention.

Each tab sub-interface 407a-407d may include one or more configuration commands 415, which may also be activated to change the configuration of the simulated wireless electronic communication network in interface 401. For example, as seen in FIG. 4A, the tab sub-interface 407d (corresponding to the use of a notebook as a network entry device) includes the configuration command 415a, entitled "Notebook with PC Card Modem." It also includes the configuration command 415b, entitled "Notebook/Phone (tethered)" and the configuration command 415c, entitled "Notebook/Phone (infrared)." If the user activates the configuration command 415c, then the interface 401 is changed to reflect this configuration.

Figure 4G:
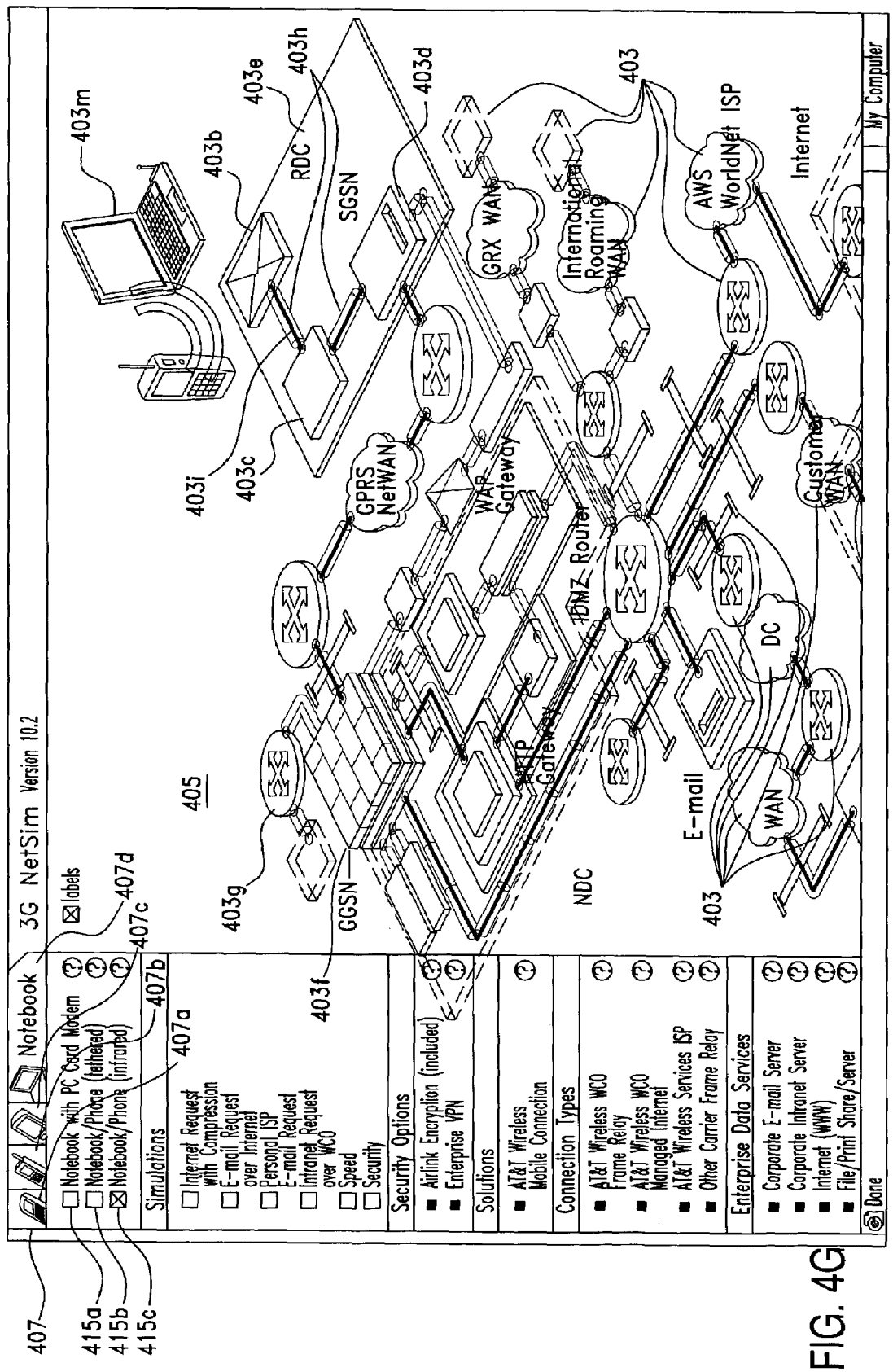

More particularly, as shown in FIG. 4G, the component graphical object 403a (representing a wireless modem-equipped notebook computer) is replaced with a component graphical object 403m representing a notebook computer communicating with a telephone via an infrared connection. It should be noted, however, that the interface 401 will be updated to reflect any changes to the communication network produced by a configuration represented by a selected tab sub-interface 407. For example, if a configuration corresponding to a tab sub-interface 407 uses a particular data path, then the interface 401 would be updated to show this data path when the user selected the tab sub-interface 407.

As with the tab sub-interfaces 407a-407d, the configuration commands 415 may be implemented using a variety of techniques. For example, each configuration command 415 may be a link to a new markup language page 203 corresponding to the configuration designated in the command. Alternately, the configuration commands 415 may cause the initial markup language page 203 to obtain and display page segments 203 containing those component graphical objects 403 appropriate to the configuration designated in the command. Of course, still other techniques for implementing the configuration commands 415, such as the use of an animation process, will be apparent to those of ordinary skill in the art.

The tab sub-interfaces 407a-407d may also include one or more simulation commands 417. For example, the tab sub-interface 407d includes the simulation command 417a (entitled "Internet Request with Compression"), the simulation command 417b (entitled "E-mail Request over Internet"), and the simulation command 417c (entitled "Speed"). Activating these simulation commands provides still further educational information regarding the configuration of the wireless electronic communication network represented in interface 401. For example, the user may activate the simulation command 417a to simulate how the communication network processes a request for data from the Internet using data compression. In response, the interface 401 runs a series of animation processes showing and explaining the passage of data to and from the notebook computer during an Internet request that uses data compression.

Figure 4H:
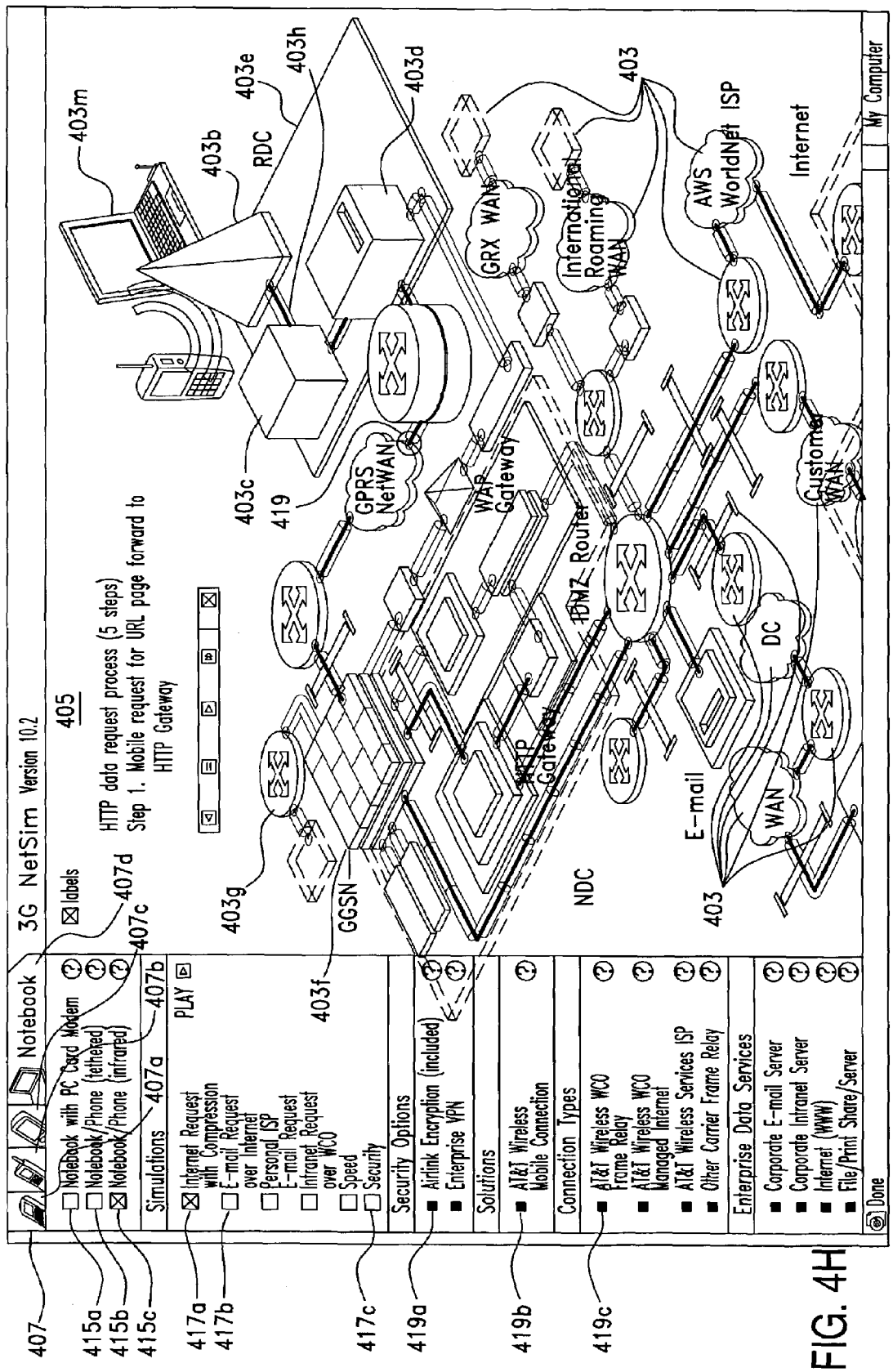

More particularly, the interface 401 displays an animation process that graphically shows where data from the notebook is routed through the wireless electronic communication network during the first step of such a request. For example, as shown in FIG. 4H, interface 401 may display a colored ball 419 passing along the component connections employed for the first step of the Internet request. At the same time, an explanation of the first step of the process is displayed in the information display graphical object 405. Additionally, the interface 401 may animate each component graphical object 403 that represents a component through which the data passes (for example, animating the component graphical object 403b from a flat triangle to a tall pyramid). If the user wishes to obtain information regarding the second or subsequent steps of the Internet request, the use can continue the animation process until it has displayed each step of the Internet request procedure.

Figure 4I:
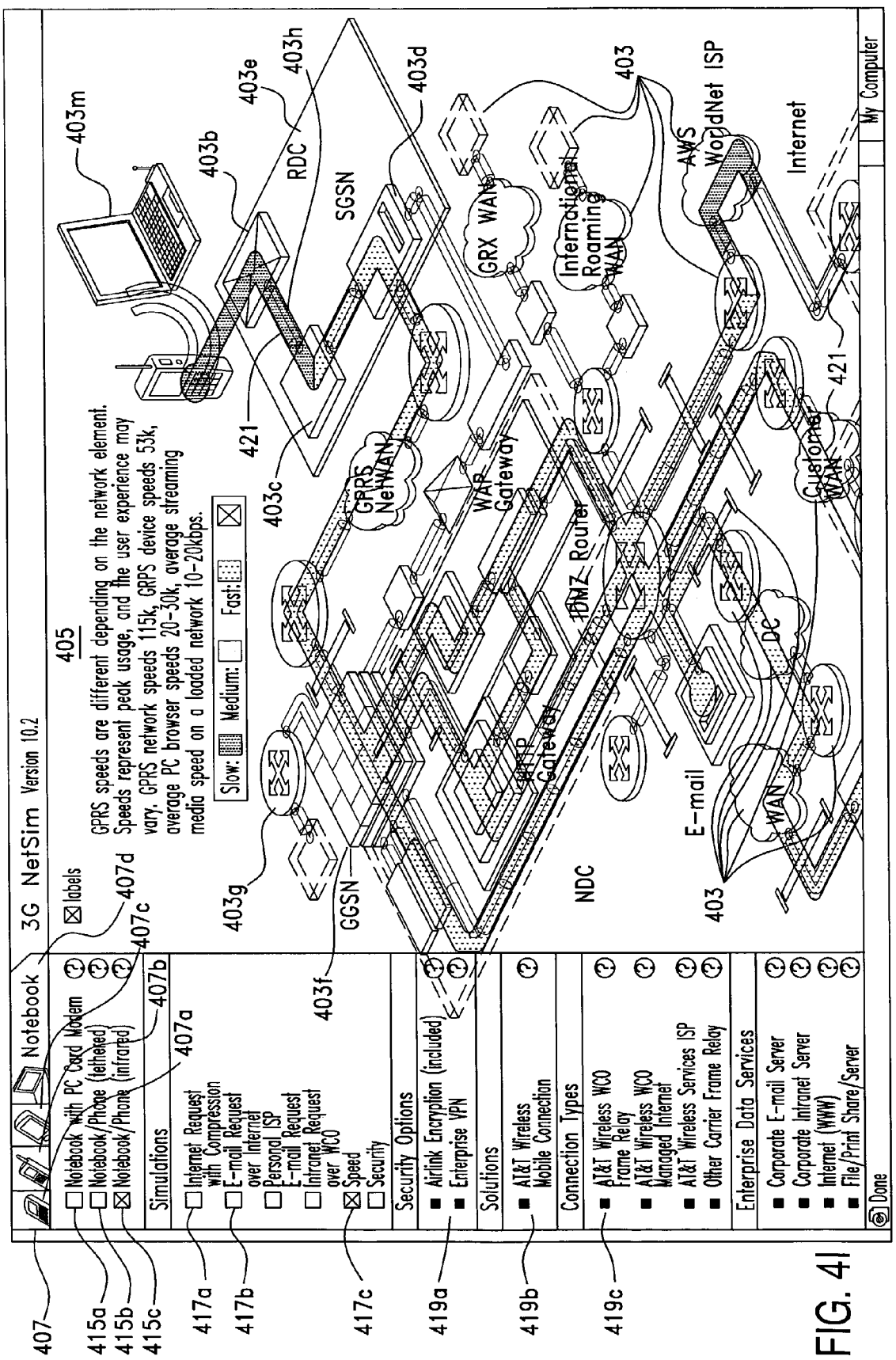

Similarly, if the user activates the simulation command 417c to simulate the relative data transmission speeds for accessing the customer data center from the network entry device, then the interface 401 runs an animation process showing the relative data transfer rates for a transfer of data from the notebook (represented by the component graphical object 403a) to the customer data center. For example, as shown in FIG. 4I, the interface 401 may run an animation process displaying a path 421 overlaying the connections employed by a data transfer from the notebook to the customer data center. With this embodiment, the path 421 is multicolored or shaded, with each color or shade representing a different data transfer speed. In addition, the interface 401 may display data transfer speed information in the information display graphical object 405. Of course, those of ordinary skill in the art will appreciate that one or more other simulation commands 417 can additionally or alternately be provided to display any suitable information desired by a user.

Figure 4J:
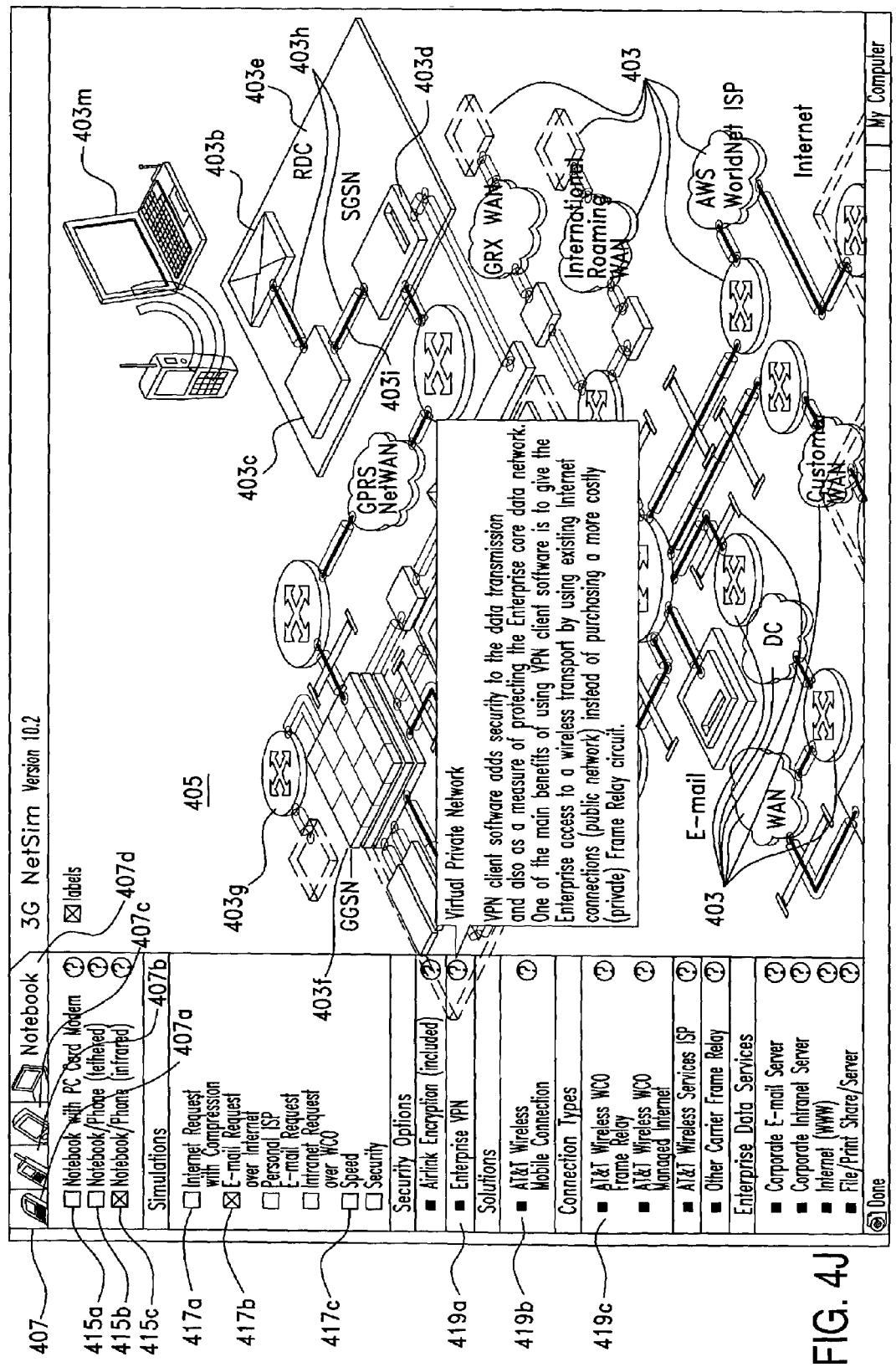

Each tab sub-interface 407a-407d may also include one or more service option links 419, each link 419 being associated with a service option available through the simulated wireless electronic network. For example, as seen in FIG. 4A, the tab sub-interface 407d includes the service option link 419a (entitled "Enterprise VPN"), the service option link 419b (entitled "AT&T Wireless Mobile Connection"), and the service option link 419c (entitled "AT&T Wireless WCO Frame Relay"). If the user activates a service option link 419, the interface 401 displays information regarding that service option. For example, if the user activates the service option link 419a, the interface 401 displays information 423 relating to the Enterprise Virtual Private Network available through the simulated wireless electronic communication network, as shown in FIG. 4J. In the illustrated embodiment, the information 423 is displayed in a pop-up object, but any other suitable technique for displaying the information 423 may also be employed. For example, the information 423 may be displayed in an independent window, or audibly played back for the user.

In the illustrated embodiment, the service option links 419 are consistently maintained regardless of the simulation command 417 a user selects. It should be noted, however, that the wireless electronic communication network configuration represented by a simulation command 417 may not include or permit a service option represented by a service option link 419. For example, as shown in FIG. 4H, if the user activates the simulation command 417a, corresponding to an Internet request made using data compression, the service option link 419a continues to be displayed, even though the wireless electronic communication network being simulated does not allow the use of an Enterprise VPN for an Internet request employing data compression.

It should be noted, however, that with the illustrated embodiment, if a service option is not available for the configuration represented by a selected simulation, then the corresponding service option link 419 is displayed against a gray background, as may be seen in FIG. 4H. If a service option is available for the configuration represented by a selected simulation, then the corresponding service option link 419 is displayed against a white background. For example, while an Internet request made using data compression cannot be made using an Enterprise VPN, a request for email over the Internet can. If a user selects the simulation command 417b (representing an email request submitted over the Internet), the service option line 419 (corresponding to the Enterprise VPN) is thus displayed against a white background as shown in FIG. 4J. Of course, other techniques for indicating which service options are available for different configurations may be employed. For example, rather than displaying a service option link 419 against a gray background, the interface 401 may simply omit a service option link 419 when its corresponding service is unavailable, or mark through the link 419 with a line.

As will be apparent from the foregoing description, various embodiments of the education tool provide a user with educational information regarding a wireless electronic communication network. It should be noted that the education information provided by the tool may be any information that informs the user regarding the network. For example, if the user is someone who will be managing the operation of the wireless electronic communication network, the educational information may be any information that assists the user in performing that management function.

Similarly, if the tool is for someone who is considering purchasing a subscription for use of the network (that is, a potential customer who is considering purchasing access to the network), then the tool may provide educational information to the user that may assist the user in making a purchase decision. For example, the educational information may include cost information relating to the cost of subscribing to various configurations of the network. Thus, if the user is considering purchasing access to the wireless electronic communication network through a wireless modem-equipped personal digital assistant, then the educational information may include cost information indicating the cost of (or the savings obtained by) subscribing to network access through this configuration. Alternately, if the user employs the tab sub-interface 704a to obtain educational information regarding access to the network using a different configuration (that is, through a RIM Blackberry device), then the educational information may include cost information indicating the cost of (or the savings obtained by) subscribing for network access through this different configuration.

Of course, any type of information that informs a user about the simulated system may be provided through the education tool of the invention. Also, while the tool has been described with particular regard to providing education information relating to a wireless electronic communication network, the tool according to the invention is much more versatile. In fact, the education tool of the invention may be used to provide educational information relating to any desired system, as will be appreciated by those of ordinary skill in the art.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention, and the written description of the invention contained herein is intended to cover all such modifications and alterations.

What is claimed is:

1. A method of providing educational information about a wireless electronic communications system, the educational information being wireless terminal configuration specific, comprising:

displaying a system comprising a predetermined set of multiple components of a wireless electronic communication system as a preconfigured display of a plurality of graphical objects, each graphical object corresponding to a component of the system, the display showing a physical relationship between the components of the system, the display further showing at least one connecting graphical object representing a connection between a first and a second component of the system, an appearance of the connecting graphical object indicating a nature of the connection between the first and second components, the display further comprising a menu portion comprising selectable sub-interfaces, one sub-interface representing a user equipment configuration, the menu further comprising a plurality of simulations responsive to a selection of a sub-interface for a user equipment configuration and a plurality of service options responsive to the selection of a second sub-interface;

receiving a first signal indicative of a selection of one of the plurality of graphical objects in the display, said signal being indicative of a request for educational information regarding a component corresponding to said selected graphical object, an appearance of said graphical object in the display changing to indicate its selection, said change in appearance being one of a change in a dimensionality of said selected graphical object, a size of said selected graphical object, and a shape of said selected graphical object;

in response to said request for educational information, displaying first information regarding the component of the system corresponding to the selected graphical object, the first information including information relating to one of an identity, a function, and a characteristic of the component corresponding to the selected graphical object; and further in response to said request for information, providing second information regarding a connection between the component corresponding to the selected graphical object and a component corresponding to a second graphical object connected to the selected graphical object in the preconfigured display, the connection being represented by a connection graphical object, the connection graphical object including one of a pipeline image and a data line image, the information including one of a characteristic of the connection and a status of a data transfer between the component corresponding to the selected graphical object and the component corresponding to the graphical object connected thereto, the second information being provided by a change in appearance in said connection graphical object upon the selection of the graphical object; and further in response to selection of a sub-interface for a user equipment configuration different from a first selection of a sub-interface for a user equipment configuration, reconfiguring said preconfigured network to display a different network configuration consistent with the selection of said different sub-interface and further providing, upon selection, a display of an associated simulation with the selected different sub-interface or providing, upon selection, a display of an associated service option with the selected different sub-interface.

2. The method of providing educational information recited in claim 1, further including receiving a second signal indicative of a second selection of the selected graphical object, said second selection being indicative of a request for further educational information regarding the component of the system corresponding to the selected graphical object; and provide second educational information regarding the component of the system corresponding to the selected graphical object, said second educational information being provided by one of an audio playback and a visual display.

3. The method of providing educational information recited in claim 2, wherein the second educational information is displayed concurrently with at least one of the first educational information and the plurality of graphical objects.

4. The method of providing educational information recited in claim 2, wherein the second educational information display includes an additional information request object, and further including receiving a third signal indicative of a selection of the additional information request object, and providing third educational information regarding the component of the system corresponding to the selected graphical object, said third educational information being provided by one of an audio playback and a visual display.

5. The method of providing educational information recited in claim 4, wherein the third educational information includes a second additional information request object, and further including receiving a fourth signal indicative of a selection of the second additional information request object; and displaying fourth information relating to the component of the system represented by the selected graphical object.

6. The method of providing educational information recited in claim 1, wherein the plurality of graphical objects includes graphical objects corresponding to each of a router, a home location register, and a server.

7. The method of providing educational information recited in claim 1, further including:

animating the selected graphical object to indicate its selection, said animation resulting in a change in displayed dimensionality of the graphical object.

8. The method of providing educational information recited in claim 1, wherein the physical relationship between the components of the system represented by the graphical objects includes a static connection between a plurality of components of the system.

9. The method of providing educational information recited in claim 1, wherein the physical relationship between the components of the system represented by the graphical objects includes an operational characteristic of the system.

10. A method of providing educational information about a system, comprising:

displaying a preconfigured system comprising multiple components as a predetermined plurality of graphical objects, each graphical object corresponding to a component of the system, the display showing a physical relationship between the components of the system, the display further showing at least one connection between a first and a second component of the system as one of a pipeline image and a data line image, the display further showing a menu portion comprising a sub-interface representing user terminal configuration, selectable simulations and selectable service options;

providing a system configuration selection interface for selecting a new system configuration, the new system configuration including one of a new system component and a new configuration of existing system components;

providing one or more system configuration selection sub-interfaces, each sub-interface corresponding to a user terminals configurations of the system;

receiving a signal indicative of a selection of a user terminal configuration from said sub-interface representing user terminal configuration;

displaying a new graphical object representing the system component corresponding to the selected sub-interface;

displaying a plurality of selectable and a plurality of selectable service options responsive to said user terminal configuration selection signal;

receiving a further indicative of a selection of one of the plurality of graphical objects, said signal being further indicative of a request for information regarding a component corresponding to said selected graphical object, an appearance of said graphical object in the display changing to indicate its selection, said change in appearance being one of a change in a dimensionality of said selected graphical object, a size of said selected graphical object, and a shape of said selected graphical object;

displaying educational information regarding the component of the system corresponding to the selected graphical object, the education information including information relating to one of an identity, a function, and a characteristic of the selected graphical object;

receiving a second signal indicative of a selection of the new system configuration and changing the display of the plurality of graphical objects so as to graphically represent the new system configuration, the new system configuration including one of a new system component and a new arrangement of existing system components; and receiving a third signal indicative of a selection of one of the system configuration selection sub-interfaces and displaying a new graphical object representing the system component corresponding to the selected sub-interface and displaying a different network configuration.

11. A method of providing educational information about a wireless electronic communications system, comprising:

displaying a first system configuration comprising a predetermined plurality of multiple components as a first preconfigured display of a plurality of graphical objects, each graphical object corresponding to a component of the system, the display showing a physical relationship between the components of the system, the display further showing at least one connection between a first and a second component of the system, an appearance of said connection indicating whether said connection is being used to transfer data between said first and second component in said preconfigured system, the display further comprising a menu portion comprising selectable sub-interfaces, one sub-interface representing a user equipment configuration, the menu further comprising a plurality of simulations responsive to a selection of a sub-interface for a user equipment configuration and a plurality of service options responsive to the selection of said sub-interface for a user equipment configuration;

receiving a first signal indicative of a selection of one of the plurality of graphical objects, said signal being indicative of a request for information regarding a component corresponding to said selected graphical object, an appearance of said graphical object in the display changing to indicate its selection, said change in appearance being one of a change in a dimensionality of said display, a size of said display, and a shape of said display;

in response to the selection of the graphical object, providing first information regarding a connection between the component corresponding to the selected graphical object and a component corresponding to a second graphical object connected to the selected graphical object in the preconfigured display, the connection being represented by a one of a pipeline image and a data line image, the information including at least one of a characteristic of the connection and a status of a data transfer between the selected graphical object and the second graphical object connected thereto, the first information being provided by a change in appearance in said connection upon the selection of the graphical object;

providing a system configuration selection sub-interface for selecting one of a plurality of displayed graphical object to substitute for one of said predetermined graphical objects in the preconfigured system to create a new system configuration;

receiving a second signal indicative of a selection of the new system configuration;

generating a second display of the plurality of graphical objects so as to graphically represent the new system configuration, the new system configuration including said new system component in a new system arrangement, wherein an appearance of a graphical object indicating a connection between said new system component and an existing system component in the system configuration indicates a status of a communications channel between said new system component and said existing system component.

12. The method of providing information regarding a system recited in claim 11, further including providing price information relating to the new system configuration associated with a selection of a sub-interface.

13. The method of providing information regarding a system recited in claim 12, wherein the price information includes information of a cost relating to the new system configuration associated with a selection of a sub-interface.

14. The method of providing information regarding a system recited in claim 13, wherein the price information includes information of a cost relating to the new system component associated with a selection of a sub-interface.

15. The method of providing information regarding a system recited in claim 12, wherein the price information includes information of a cost savings relating to the new system configuration associated with a selection of a sub-interface.

16. The method of providing information regarding a system recited in claim 11, wherein
the display of graphical objects representing the new system configuration includes a display of operational characteristics of the new system configuration.

17. The method of providing information regarding a system recited in claim 11, wherein displaying the new system configuration includes displaying the plurality of graphical objects to represent static connections between components of the new system configuration.

18. The method of providing information regarding a system recited in claim 11, further including providing price information relating to the system component corresponding to the selected sub-interface.

19. The method of providing information regarding a system recited in claim 11, wherein the system configuration selection sub-interface includes a simulation command corresponding to an operation of the system, and further including:
receiving a signal indicative of a selection of a simulation command; and
displaying operation information representing the operation corresponding to the selected simulation command.

20. The method of providing information regarding a system recited in claim 19, wherein the operation information includes an animation demonstrating the operation corresponding to the selected simulation command.

21. The method of providing information regarding a system recited in claim 11,
wherein the system configuration selection sub-interface includes a service option link, the service option link corresponding to a service available through the system, and further including:
receiving a signal indicative of a selection of the service option link; and
displaying service information representing an available service corresponding to the selected service option link.

22. The method of providing information regarding a system recited in claim 21, further including providing price information for the available service corresponding to the selected service option link.

23. The method of providing information regarding a system according to claim 11, further including:
receiving a third signal indicative of a selection of one of the plurality of graphical objects, said signal being indicative of a request for information regarding a component corresponding to said selected graphical object, an appearance of said graphical object in the display changing to indicate its selection, said change in appearance being one of a change in a dimensionality of said selected graphical object, a size of said selected graphical object, and a shape of said selected graphical object; and
displaying education information regarding the component of the system corresponding to the selected graphical object, the education information including information relating to one of an identity, a function, and a characteristic of the selected graphical object.

24. The method of providing educational information according to claim 11, further wherein the first display of graphical objects includes a representation of a first data path between the components of the first system configuration and the second display of graphical objects includes a representation of a second data path between the components of the second system configuration.

25. The method of providing educational information according to claim 11, wherein the status of data transfer between the component corresponding to the selected graphical object and the component corresponding to the graphical object connected thereto is indicated by a color of the connection between the two graphical objects.

26. The method of providing educational information according to claim 25, wherein the color of the connection between the two graphical objects indicates a speed of data transfer.

27. The method of providing educational information according to claim 1, wherein the status of data transfer between the component corresponding to the selected graphical object and the component corresponding to the graphical object connected thereto is indicated by a color of the connection between the two graphical objects.

28. The method of providing educational information according to claim 27, wherein the color of the connection between the two graphical objects indicates a speed of data transfer.

* * * * *

UNITED STATES PATENT AND TRADEMARK OFFICE
CERTIFICATE OF CORRECTION

PATENT NO. : 7,360,158 B1  
APPLICATION NO. : 10/279170  
DATED : April 15, 2008  
INVENTOR(S) : Beeman Page 1 of 1

It is certified that error appears in the above-identified patent and that said Letters Patent is hereby corrected as shown below:

Col. 13, line 63, please replace "configuration," with -- configurations, --  
Col. 14, line 6, please replace "terminals configurations" with -- terminal configuration --  
Col. 14, line 9, please replace "configuration;" with -- configurations; --  
Col. 14, line 12, please replace "selectable and" with -- selectable simulations and --  
Col. 14, line 15, please replace "further indicative" with -- further signal indicative --

Signed and Sealed this

Thirtieth Day of September, 2008

JON W. DUDAS  
*Director of the United States Patent and Trademark Office*